(12) United States Patent
Mahesh et al.

(10) Patent No.: US 7,948,961 B2
(45) Date of Patent: May 24, 2011

(54) WIRELESS PROXIMITY ESTIMATION

(75) Inventors: Kumar Mahesh, San Ramon, CA (US); Karthik Krishnaswami, San Jose, CA (US); Karen Wang, Palo Alto, CA (US); Jeffrey M. Gilbert, Palo Alto, CA (US); Chuen-Shen (Bernard) Shung, San Jose, CA (US); Chih-Yuan Hsieh, San Jose, CA (US); Kyeong Ryu, Danville, CA (US); Prakash Kamath, Santa Clara, CA (US)

(73) Assignee: Sibeam, Inc., Sunnyvale, CA (US)

( * ) Notice: Subject to any disclaimer, the term of this patent is extended or adjusted under 35 U.S.C. 154(b) by 626 days.

(21) Appl. No.: 12/011,404

(22) Filed: Jan. 25, 2008

(65) Prior Publication Data

US 2008/0212559 A1 Sep. 4, 2008

Related U.S. Application Data

(60) Provisional application No. 60/897,635, filed on Jan. 26, 2007.

(51) Int. Cl.
*H04J 3/00* (2006.01)

(52) U.S. Cl. ........ 370/345; 370/231; 370/235; 370/252; 370/329; 370/468

(58) Field of Classification Search .................. 370/345, 370/230, 231, 235, 252, 329, 468
See application file for complete search history.

(56) References Cited

U.S. PATENT DOCUMENTS

| | | | | |
|---|---|---|---|---|
| 2005/0234735 | A1* | 10/2005 | Williams | 705/1 |
| 2008/0031136 | A1* | 2/2008 | Gavette et al. | 370/235 |
| 2008/0101253 | A1* | 5/2008 | Shvodian | 370/252 |
| 2008/0212559 | A1* | 9/2008 | Mahesh et al. | 370/345 |

* cited by examiner

*Primary Examiner* — Ricky Ngo
*Assistant Examiner* — Luat Phung
(74) *Attorney, Agent, or Firm* — Blakely, Sokoloff, Taylor & Zafman LLP

(57) ABSTRACT

A wireless content protection system includes a coordinator, a source device, and a sink device. The coordinator includes a scheduler. The source and sink devices each have a content protection manager. One of the content protection manager allocates and releases bandwidth via the coordinator for a test message and a response message for a round-trip time computation. The test message is transmitted in a source-to-sink channel time block. The response message is transmitted in a sink-to-source channel time block. The round-trip time is the period between the end of the source-to-sink channel time block and the beginning of the sink-to-source channel time block.

26 Claims, 11 Drawing Sheets

WIRELESS PROXIMITY ESTIMATION

RELATED APPLICATIONS

This application claims the benefit of U.S. Provisional Application No. 60/897,635 filed Jan. 26, 2007.

FIELD OF THE INVENTION

The present invention relates to the field of wireless communication; more particularly, the present invention relates to support for proximity estimation for wireless communication devices.

BACKGROUND OF THE INVENTION

Content protection for movies or music includes encryption and/or various copy modes. Digital Transmission Content Protection (DTCP) is a digital rights management technology that provides a standard for content protection with respect to wired and wireless transmission of audio/video data. In order to limit DTCP to "local" content distribution, DTCP sets forth measuring a round trip time to determine the locality of the distribution so as to prevent distribution of content beyond, for example, a home network. However, because of bandwidth limitations, there may be no guarantee for a response of a sink to a test from a source to be transmitted within an allowed period of time even though the sink is "local" to the source.

SUMMARY OF THE INVENTION

A wireless content protection system includes a coordinator, a source device, and a sink device. The coordinator includes a scheduler. The source and sink devices each have a content protection manager. One of the content protection manager allocates and releases bandwidth via the coordinator for a test message and a response message for a round-trip time computation. The test message is transmitted in a source-to-sink channel time block. The response message is transmitted in a sink-to-source channel time block. The round-trip time is the period between the end of the source-to-sink channel time block and the beginning of the sink-to-source channel time block.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A system for wireless proximity estimation is described. In one embodiment, the system includes a coordinator, a source device, and a sink device. The coordinator includes a media access controller (MAC) and a scheduler. The source and sink devices each include a content protection manager. The coordinator allocates and releases bandwidth for a test message and a response message for a round-trip time computation. The test message is sent in a source-to-sink channel time block. The response message is sent in a sink-to-source channel time block. In one embodiment, the round-trip time is the period between the end of the source-to-sink channel time block and the beginning of the sink-to-source channel time block. The coordinator communicates with a source and a sink. The source may include but is not limited to a device configured to transmit data, for example, audio and video. The sink may include but is not limited to a device configured to receive the transmitted data from the source.

Figure 1:
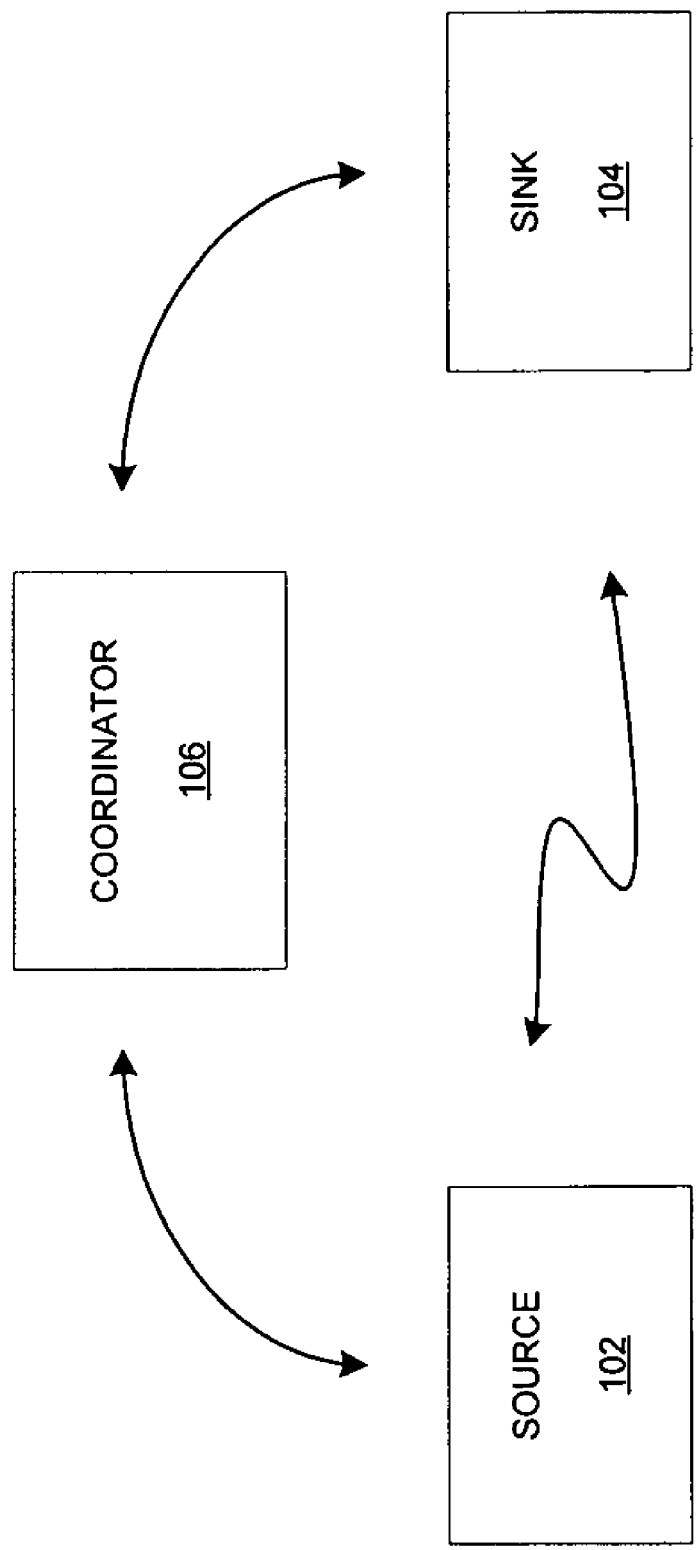
FIG. 1 is a block diagram of one embodiment of a system having a coordinator, a source and a sink.

FIG. 1 is a block diagram of one embodiment of a system for supporting wireless content protection. In one embodiment, the system may include a coordinator 106, a source 102, and a sink 104. Sink 102 may request coordinator 106 to dedicate bandwidth over wireless communication between the sink, the source, and the coordinator.

In one embodiment, sink 102 requests coordinator 106 to dedicate a source-to-sink channel time block (CTB) and a sink-to-source channel time block (CTB). In another embodiment, source 102 requests coordinator 106 to allocate a source-to-sink channel time block (CTB) and sink 104 requests coordinator 106 to allocate a sink-to-source channel time block (CTB).

Figure 2:
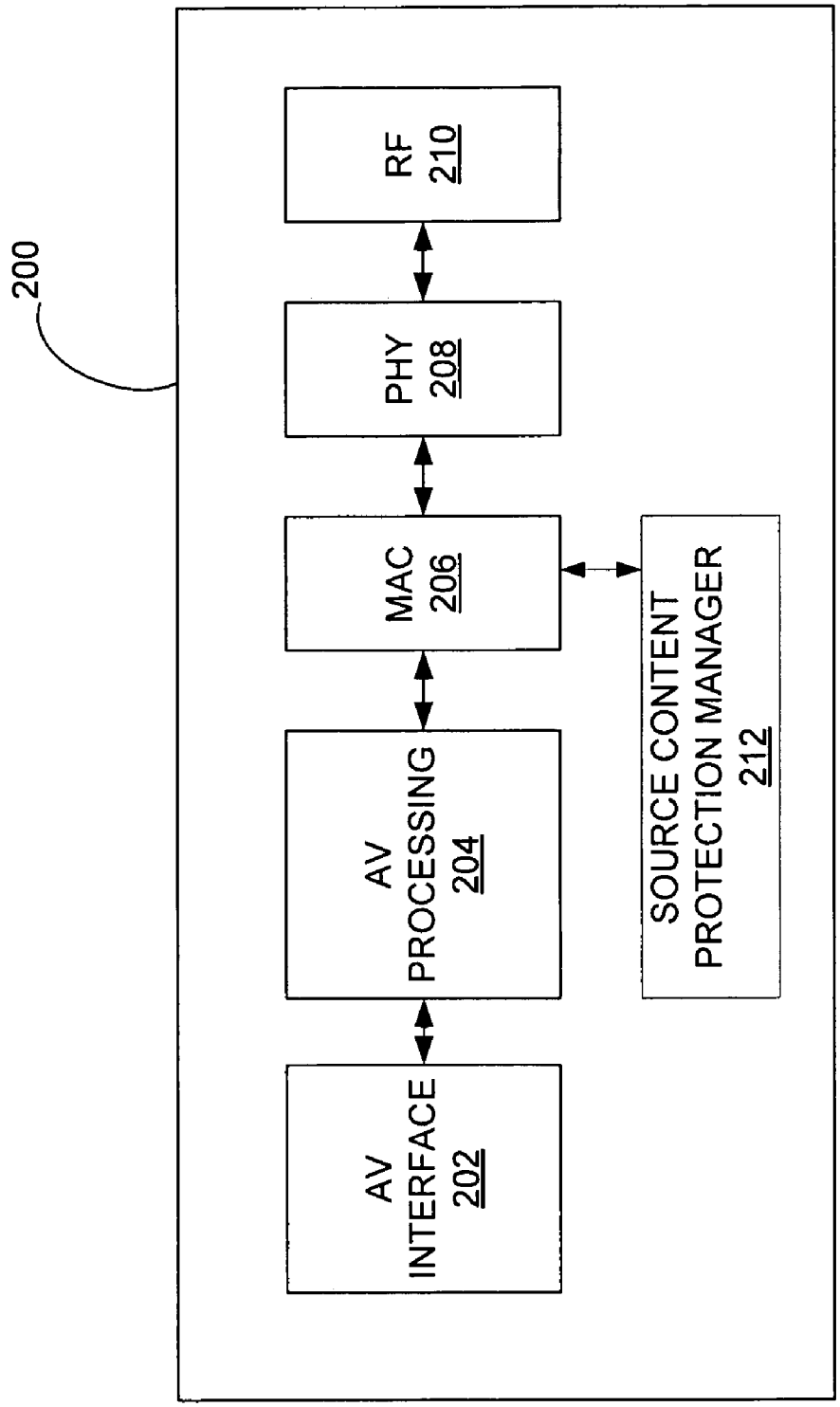
FIG. 2 is a block diagram of one embodiment of a source.

FIG. 2 is a block diagram of an embodiment of a source 200. The source 200 includes an Audio/Video interface 202, an Audio/Video (AV) processor 204, a media access controller (MAC) 206, a physical device interface (PHY) 208, a radio module 210, and a concurrent association manager 212. The AV interface 202 may be configured to interface with various medium (e.g., disks, cameras, tuners, memory cards, etc. . . . ). AV processor 204 receives and processes data from AV interface 202. In one embodiment, AV processor 204 generates baseband signals that are processed by a baseband signal processor prior to being wirelessly transmitted by a phased array antenna. MAC 206 generates and parses physical frames. PHY 208 monitors how this data is actually moved to/from the radio module 210. As an example, a wireless specification could support two basic types of PHY: high rate PHY (HRP) and low rate PHY (LRP).

In one embodiment, source content protection manager 212 is coupled to MAC 206 to enable source 200 to obtain the dedicated bandwidth from a coordinator to support wireless content protection. Because of bandwidth limitations, there is no guarantee for a sink to respond to an RTT test from a source within an allowed period of time even though the sink is "local" to the source. As such, a portion of the bandwidth is dedicated and allocated for the RTT test packet and the response to the RTT test packet. The operations of source content protection manager 212 are described in more detail with respect to FIG. 8.

Figure 3:
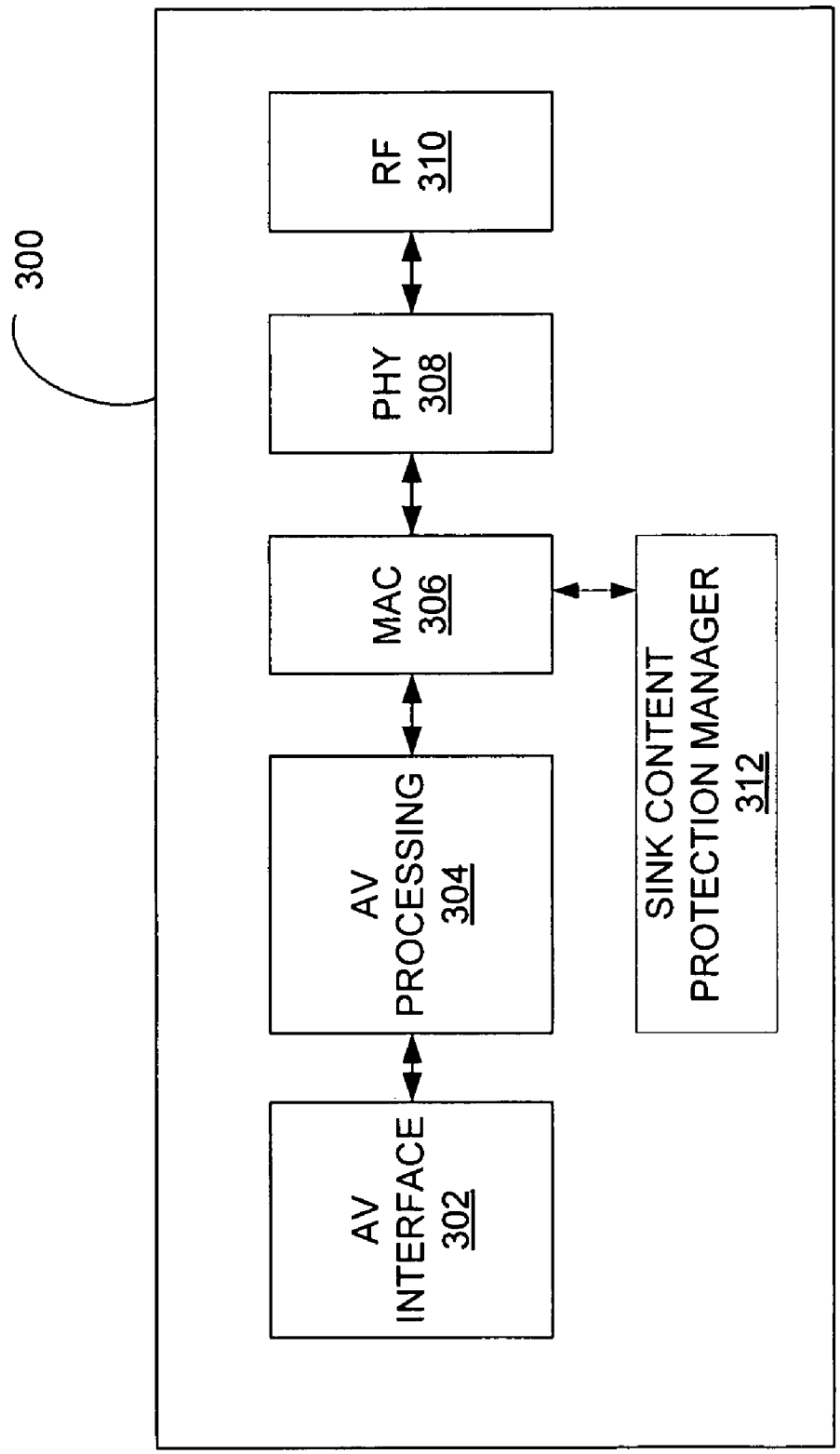
FIG. 3 is a block diagram of one embodiment of a sink.

FIG. 3 is a block diagram of an embodiment of a sink 300. The sink 300 includes an Audio/Video interface 302, an Audio/Video (AV) processor 304, a media access controller (MAC) 306, a physical device interface (PHY) 308, a radio module 310, and a sink content protection manager 312. The AV interface 302 may be configured to interface with various data medium (e.g., disks, displays, memory cards, etc. . . ). AV processor 304 receives and processes data from AV interface 302. MAC 306 handles generating and parsing physical frames. PHY 308 handles how this data is actually moved to/from the radio module 310. As an example, a wireless specification could support two basic types of PHY: high rate PHY (HRP) and low rate PHY (LRP).

In another embodiment, sink content protection manager 312 is coupled to MAC 306 to enable sink 300 to obtain the dedicated bandwidth from a coordinator to support wireless content protection. As such, a portion of the bandwidth is dedicated and allocated for the RTT test packet and the response to the RTT test packet. The operations of sink content protection manager 312 are described in more detail with respect to FIG. 9.

Figure 4:
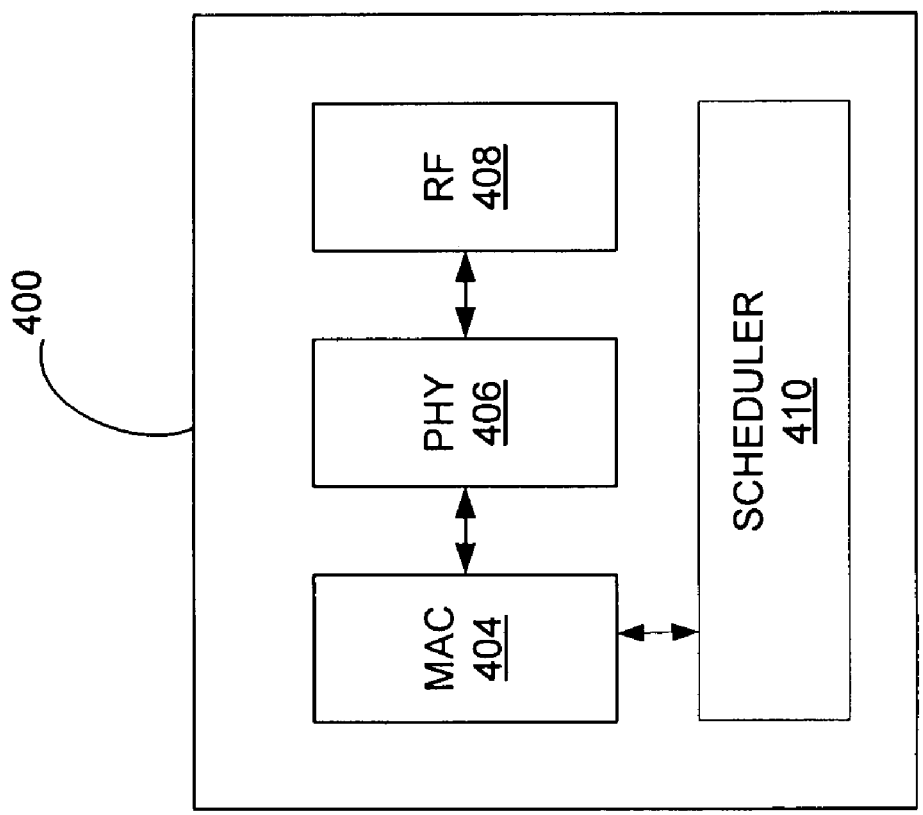
FIG. 4 is a block diagram of one embodiment of a coordinator.

FIG. 4 is a block diagram of one embodiment of a coordinator 400. Coordinator 400 may include a media access controller (MAC) 404, a physical device interface (PHY) 406, a radio module 408, and a scheduler 410. MAC 404 handles generating and parsing physical frames. PHY 406 handles how this data is actually moved to/from the radio module 408.

Scheduler 410 is coupled to MAC 404 to enable a system comprising the coordinator, a source, and a sink to support wireless content protection. The operations of scheduler 410 are described in more detail with respect to FIG. 10.

Figure 5:
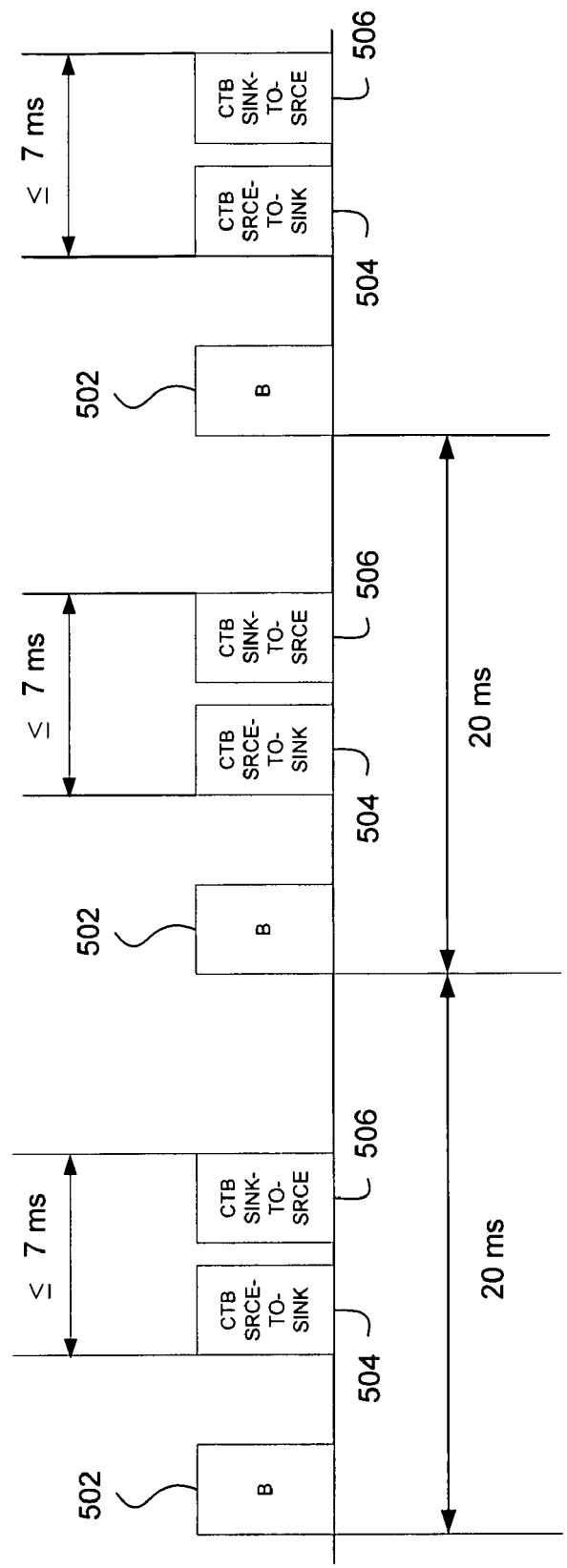
FIG. 5 is a block diagram illustrating a time line depicting allocated bandwidth for a first time test in one embodiment.

FIG. 5 is a block diagram illustrating a time line depicting allocated bandwidth for a first time test in one embodiment. Upon an initial connection between a source and a sink, the source may request for dedicated bandwidth where plenty of bandwidth is currently available. Usually, if there is sufficient bandwidth available for the connection, there is often enough bandwidth for the RTT message. In one embodiment, in a first-time RTT test, the protected content can only be transmitted once successful RTT occurs. In one embodiment, the RTT test is performed after initial authentication steps, but prior to overall authentication completion. The bandwidth illustrated in FIG. 5 shows the periodic beacons 502 generated by a coordinator such as the one previously described in FIG. 4. In one embodiment, the periodic interval between each beacon is about 20 ms. In one embodiment, the allocated bandwidth to support wireless content protection includes a source-to-sink CTB 504, and a sink-to-source CTB 506. In one embodiment, the time between CTB 502 and CTB 504 needs to be less than a predetermined time period to fulfill secured wireless content protection. For example, DTCP provides for a predetermined time period of 7 ms. As such, the time period between the beginning of CTB 504 and the end of CTB 506 needs to be less or equal to 7 ms to satisfy wireless content protection.

Figure 6:
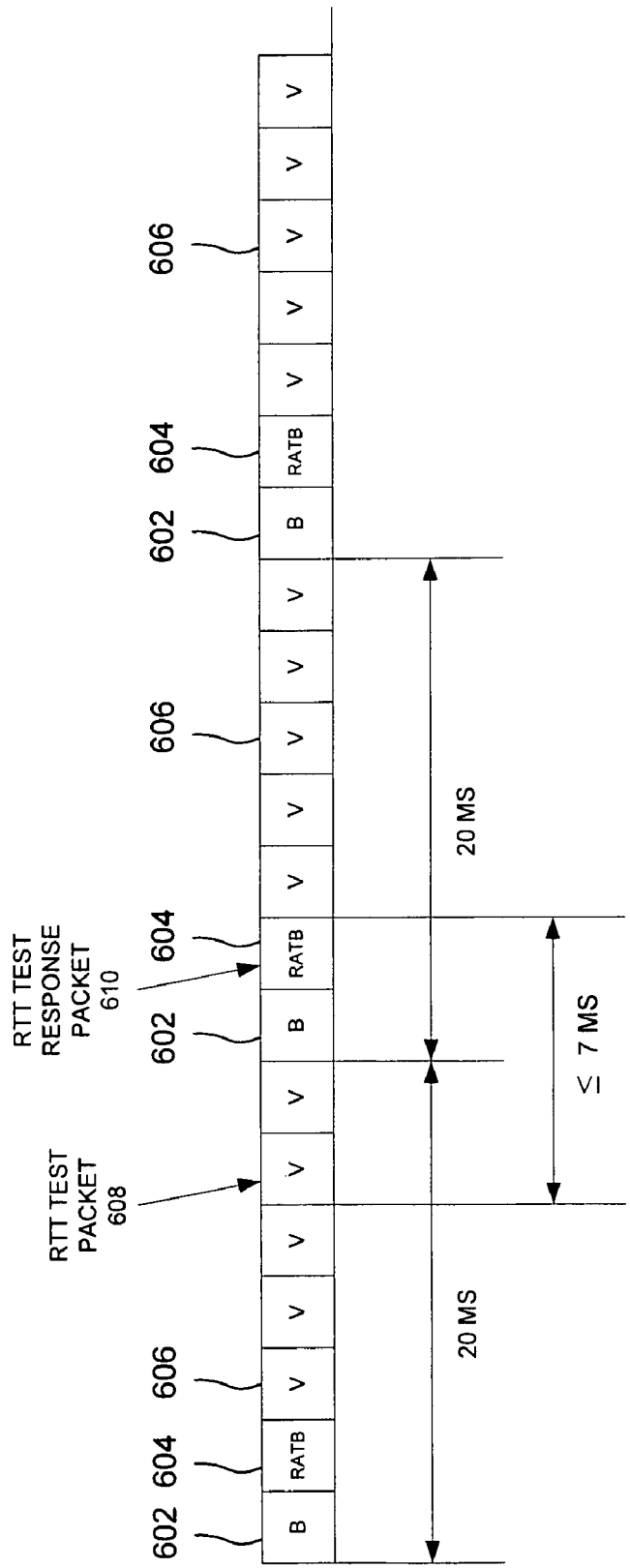
FIG. 6 is a block diagram illustrating a time line depicting allocated bandwidth for a background test in one embodiment.

FIG. 6 is a block diagram illustrating one embodiment of allocated bandwidth for a background test. During an established connection, the source is transmitting data to the sink. As such the bandwidth may be filled with transmitted data (e.g. video blocks 606). A coordinator transmits a periodic beacon 602, for example, every 20 ms. A Random Access Time Block (RATB) 604 follows each beacon 602. Source may transmit a RTT test packet along with video and audio data in the allocated bandwidth in source-to-sink CTB 608. The sink may transmit a RTT response packet in RATB 604. In one embodiment, the time between CTB 608 and RATB 604 needs to be less than a predetermined time period to fulfill secured wireless content protection. For example, one industry standard provides for a predetermined time period of 7 ms. As such, the time period between the beginning of CTB 608 and the end of RATB 604 needs to be less or equal to 7 ms to satisfy wireless content protection from that particular industry standard. If the above optional background RTT test is implemented, re-testing may be required every 40 hours of operation between successful RTT tests.

Figure 7:
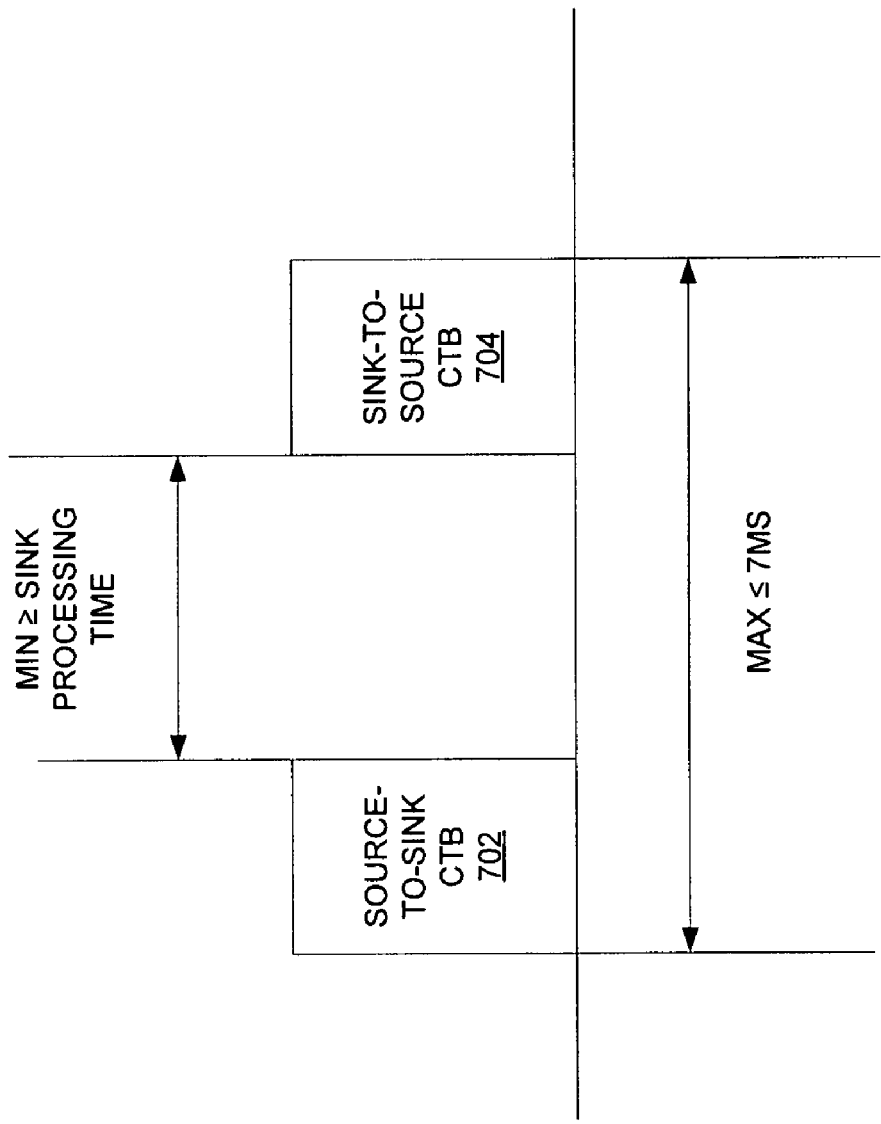
FIG. 7 is a block diagram illustrating a time line depicting a minimum sink processing time and a maximum round-trip time in one embodiment.

FIG. 7 is a block diagram illustrating one embodiment of a minimum sink processing time and a maximum round-trip time (RTT). As previously described, in one embodiment, a maximum RTT is imposed to enable and support wireless content protection. For example, the time between the beginning of CTB 702 and the end of CTB 704 needs to be less or equal to the maximum RTT. In addition, sink may take some time to process an RTT test from CTB 702. As such, a minimum sink processing time may be imposed to allow the sink process the RTT test.

Figure 8:
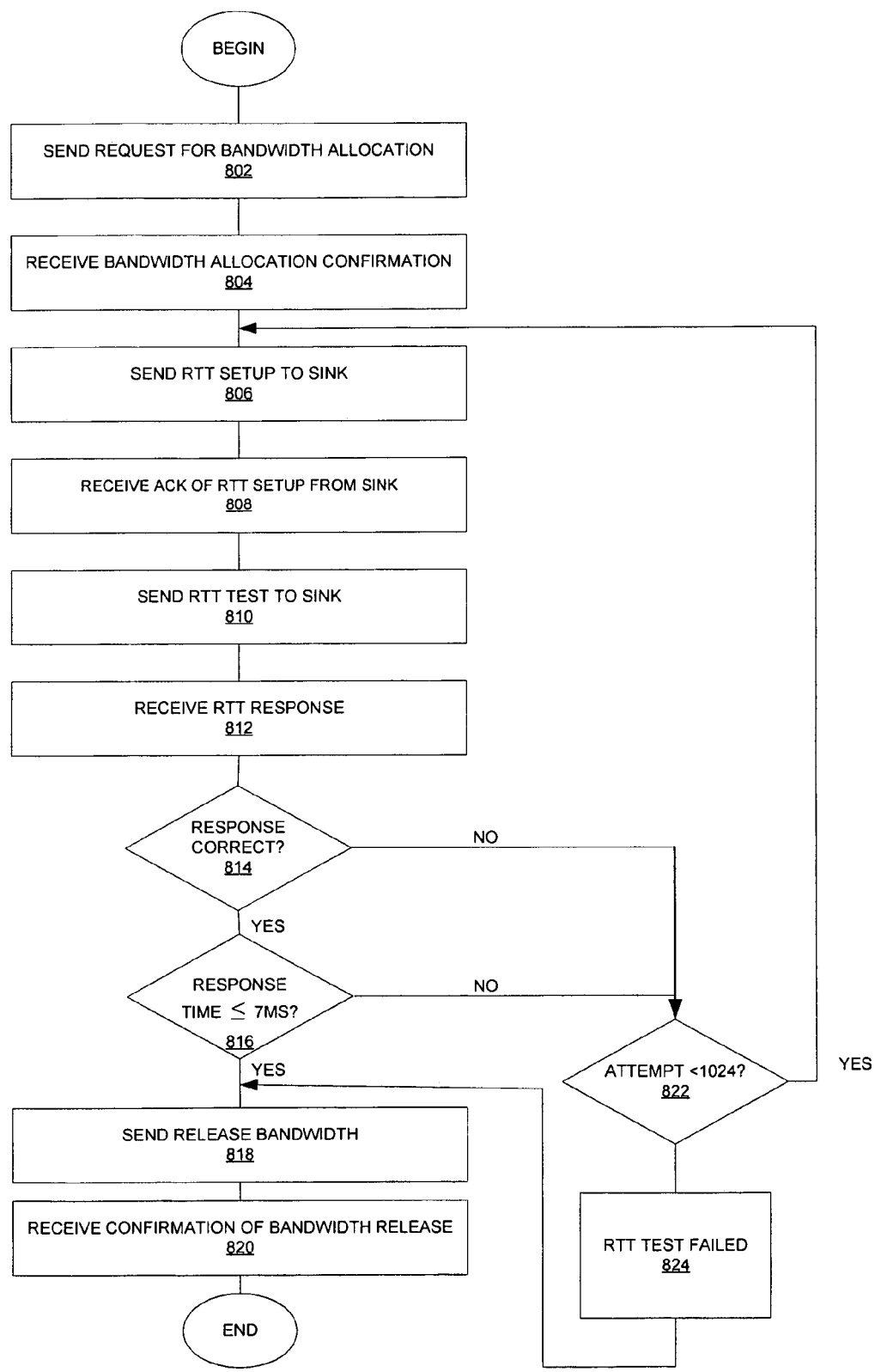
FIG. 8 is a flow diagram of one embodiment of a method used by a source for supporting wireless proximity estimation.

FIG. 8 is a flow diagram of one embodiment of a method for a source to support wireless content protection. At 802, the source sends a request for bandwidth allocation to the coordinator. At 804, the source receives a confirmation for bandwidth allocation from the coordinator. At 806, the source sends an RTT setup message to a sink. At 808, the source receives an acknowledgement of the RTT setup message from the sink. At 810, the source sends the RTT test in the allocated bandwidth. At 812, the source receives a response to the RTT test back from the sink. At 814, the source determines whether the response to the RTT test is correct. At 816, the source determines whether the response time is less than the predefined RTT maximum time. If the response to the RTT test is incorrect or if the response time is greater than the predefined RTT maximum time, the source attempts for several more times. For example, the number of attempts may be limited to 1024 attempts. If all attempts fail at 824 or upon a successful attempt, the source requests for a release of the allocated bandwidth at 818. At 820, the source receives a confirmation of the bandwidth release from the coordinator.

Figure 9:
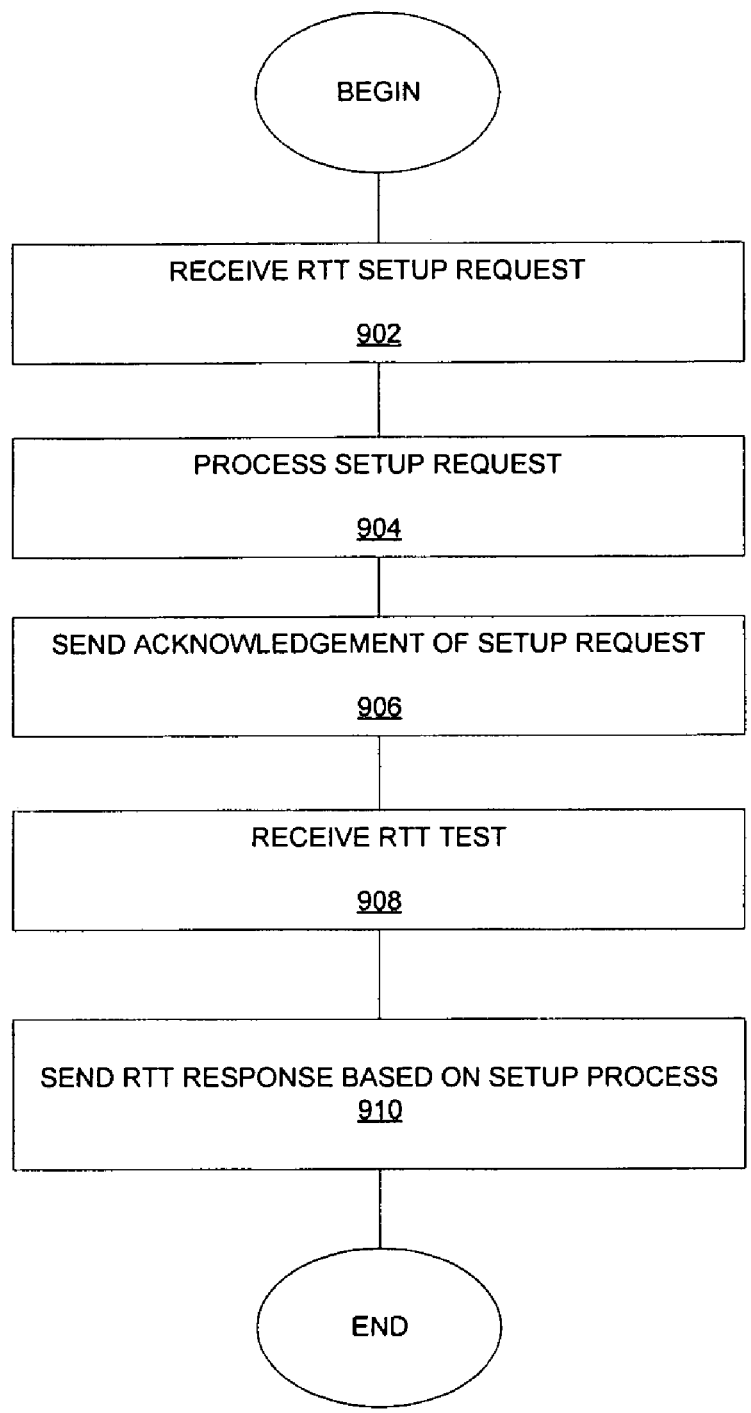
FIG. 9 is a flow diagram of one embodiment of a method used by a sink for supporting wireless proximity estimation.

FIG. 9 is a flow diagram of one embodiment of a method for a sink to support wireless content protection. At 902, the sink receives an RTT setup packet from a source. The sink processes the RTT setup packet at 904. In one embodiment, the RTT setup packet may include additional information to enable the sink to prepare and anticipate for an upcoming RTT test from the source. For example, the sink can pre-computes the RTT test packet and the RTT response packet based on information contained in the setup packet. At 906, the sink sends an acknowledgement of the RTT setup packet back to the source. At 908, the sink receives an RTT test packet in the allocated bandwidth and compares it to its own pre-computed test packet. If the RTT test packet matches with the sink's pre-computed test packet, the sink immediately sends the pre-computed response packet at 910. So, the delay involved is minimized to just the comparison. If the comparison fails, the sink does not send anything to the source in response to the RTT setup packet.

Figure 10:
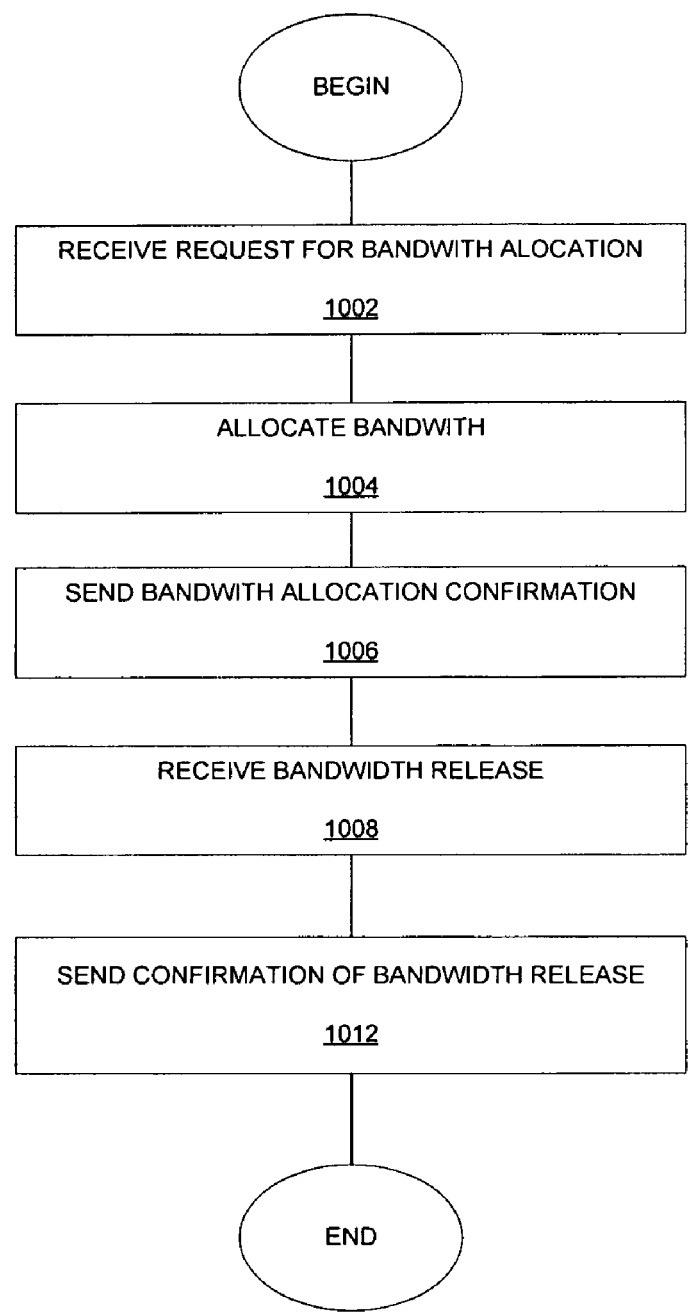
FIG. 10 is a flow diagram of one embodiment of a method used by a coordinator for supporting wireless proximity estimation.

FIG. 10 is a flow diagram of one embodiment of a method for a coordinator to support wireless content protection. At 1002, the coordinator receives a request to allocate/dedicate bandwidth to support wireless content protection. At 1004, the coordinator allocates the bandwidth at 1004 and sends confirmation of the bandwidth allocation at 1006. At 1008, the coordinator receives a request to release the allocated bandwidth. At 1010, the coordinator sends confirmation of bandwidth release after releasing the allocated bandwidth.

Figure 11:
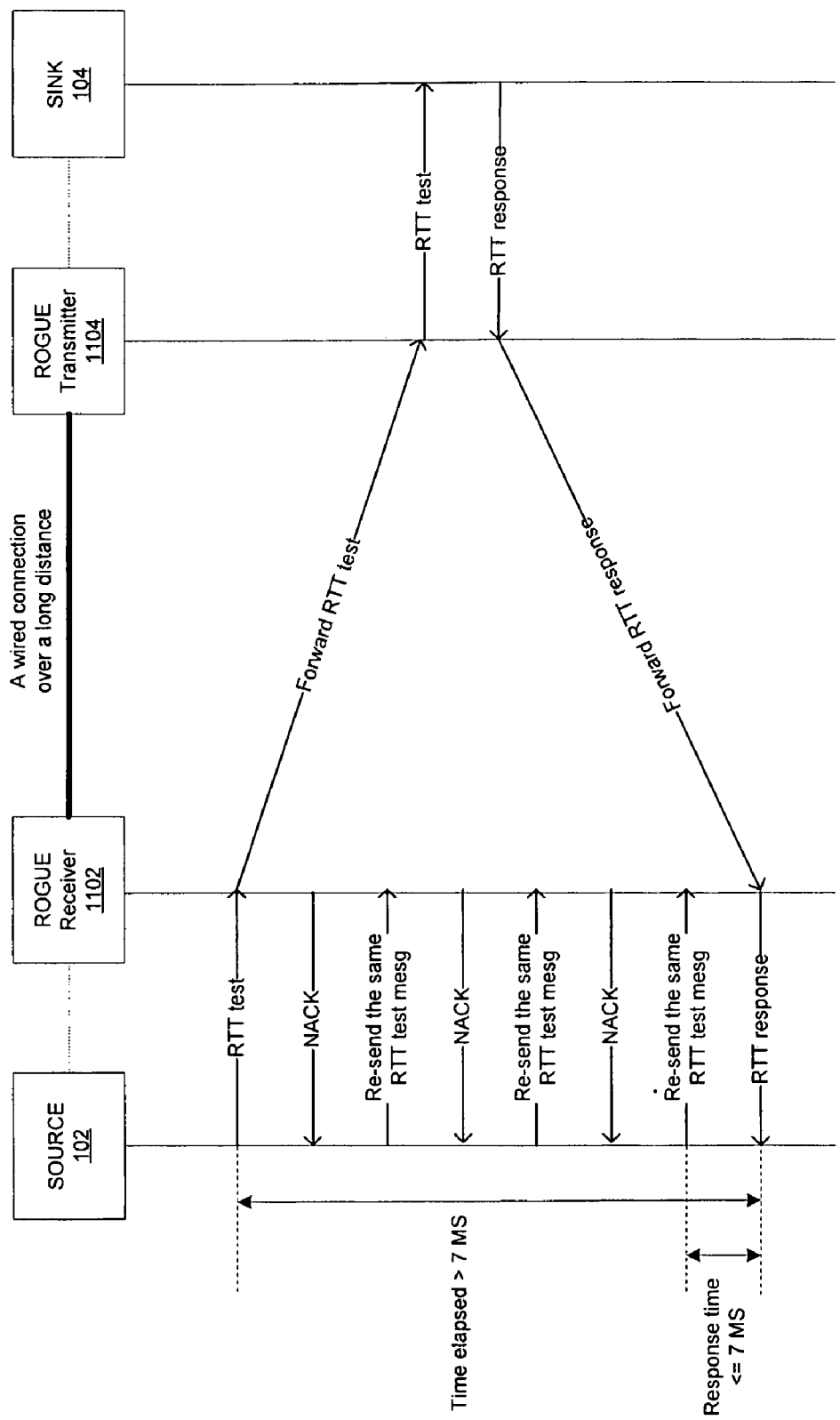
FIG. 11 is a block diagram illustrating one embodiment of a rogue system between the source and the sink.

FIG. 11 is a block diagram illustrating a scenario in which the RTT test may be compromised by rogue devices. A rogue receiver 1102 forwards the RTT test to a Sink device over a long distance via other rogues devices (such as a rogue transmitter 1104). Meanwhile, the rogue receiver 1102 replies to the Source with No Acknowledgement (NACK) message as if the transmission failed, in order to trigger Source to repeatedly re-send the same RTT test message while the source waits for the valid RTT response to be relayed back. The end-result is the round-trip-time between the RTT response and the previous RTT test meets the proximity time limit, whereas the time elapsed between the initial transmission of RTT test and the RTT response clearly violates the time limit. To prevent such relay scenario, the Source may not require an Acknowledgement message from the Sink, and may not resend the same RTT test message.

In the description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A source device comprising:
    a content protection manager to compute a response time of a response message generated in response to a test message, the test message and the response message to be transmitted in an allocated amount of bandwidth over a transmission medium,
    wherein the allocated amount of bandwidth includes a first channel time block and a second channel time block after a periodic beacon signal, the first channel time block including the test message, and the second channel time block including the response message,
    wherein a first time period between the end of the first channel time block and the beginning of the second channel time block is less than or equal to a predefined maximum time period, and a second time period between the end of the first channel time block and the beginning of the second channel time block is greater than or equal to a predefined minimum time period.

2. The source device of claim 1 wherein the content protection manager is operable to request the allocated amount of bandwidth for the test message and the response message, wherein the transmission medium includes a wireless transmission medium.

3. The source device of claim 1 wherein the content protection manager is operable to transmit a test setup packet prior to transmitting the test message.

4. The source device of claim 1 wherein the content protection manager is operable to allow a predefined number of attempts to satisfy the response time prior to enabling further transmission, wherein a new test message is generated in each attempt.

5. A source device comprising:
    a content protection manager to compute a response time of a response message generated in response to a test message, the test message and the response message to be transmitted in an allocated amount of bandwidth over a transmission medium, wherein the allocated amount of bandwidth includes a first channel time block and a second channel time block after a periodic beacon signal, the first channel time block including the test message, and the second channel time block including the response message, wherein a first time period between the beginning of the first channel time block and the beginning of the second channel time block is less than or equal to a predefined maximum time period, and a second time period between the beginning of the first channel time block and the beginning of the second channel time block is greater than or equal to a predefined minimum time period.

6. A sink device comprising:

a content protection manager to generate and transmit a response message in response to a test message, the response message and the test message to be transmitted in an allocated amount of bandwidth over a transmission medium, wherein the allocated amount of bandwidth includes a first channel time block and a second channel time block after a periodic beacon signal, the first channel time block including the test message, and the second channel time block including the response message, wherein a first time period between the end of the first channel time block and the beginning of the second channel time block is less than or equal to a predefined maximum time period, and a second time period between the end of the first channel time block and the beginning of the second channel time block is greater than or equal to a predefined minimum time period.

7. The sink device of claim 6 wherein the content protection manager is operable to request the allocated bandwidth for the response message, wherein the transmission medium includes a wireless transmission medium.

8. The sink device of claim 6 wherein the content protection manager is operable to compute a pre-computed test packet and the response message based on a test setup packet received prior to the test message, to compare the pre-computed test packet with the test message, and to respond only when the pre-computed test packet is substantially similar to the test message.

9. The sink device of claim 6 wherein the content protection manager is operable to transmit the response message for a predefined number of attempts to satisfy a response time prior to receiving further transmission from a source device.

10. The sink device of claim 6 wherein the content protection manager is operable to include the second channel time block in a Random Access Time Block.

11. A sink device comprising:

a content protection manager to generate and transmit a response message in response to a test message, the response message and the test message to be transmitted in an allocated amount of bandwidth over a transmission medium, wherein the allocated amount of bandwidth includes a first channel time block and a second channel time block after a periodic beacon signal, the first channel time block including the test message, and the second channel time block including the response message, wherein a first time period between the beginning of the first channel time block and the beginning of the second channel time block is less than or equal to a predefined maximum time period, and a second time period between the beginning of the first channel time block and the beginning of the second channel time block is greater than or equal to a predefined minimum time period.

12. A coordinator device comprising:

a scheduler to allocate an amount of bandwidth over a transmission medium for a test message generated by a source device, and a response message generated by a sink device, to enable a round-trip time computation, wherein the allocated amount of bandwidth includes a first channel time block and a second channel time block after a periodic beacon signal, the first channel time block to include the test message, and the second channel time block to include the response message, wherein a first time period between the end of the first channel time block and the beginning of the second channel time block is less than or equal to a predefined maximum time period, and a second time period between the end of the first channel time block and the beginning of the second channel time block is greater than or equal to a predefined minimum time period.

13. A coordinator device comprising:

a scheduler to allocate an amount of bandwidth over a transmission medium for a test message generated by a source device, and a response message generated by a sink device, to enable a round-trip time computation, wherein the allocated amount of bandwidth includes a first channel time block and a second channel time block after a periodic beacon signal, the first channel time block to include the test message, and the second channel time block to include the response message, wherein a first time period between the beginning of the first channel time block and the beginning of the second channel time block is less than or equal to a predefined maximum time period, and a second time period between the beginning of the first channel time block and the beginning of the second channel time block is greater than or equal to a predefined minimum time period.

14. A method comprising:

transmitting a test message in an allocated amount of bandwidth over a transmission medium, the allocated amount of bandwidth including a first channel time block and a second channel time block after a periodic beacon signal, the first channel time block to include the test message, receiving a response message in the allocated amount bandwidth in response to the test message, the second channel time block to include the response message; and computing a round-trip time based on a time different between the transmission of the test message and the receipt of the response message, wherein a first time period between the end of the first channel time block and the beginning of the second channel time block is less than or equal to a predefined maximum time period, and a second time period between the end of the first channel time block and the beginning of the second channel time block is greater than or equal to a predefined minimum time period.

15. The method of claim 14 further comprising:

requesting the allocated amount of bandwidth for the test message and the response message, wherein the transmission medium includes a wireless transmission medium.

16. The method of claim 14 further comprising:

transmitting a test setup packet prior to transmitting the test message.

17. The method of claim 14 further comprising:
allowing a predefined number of attempts to satisfy the response time prior to enabling further transmission, wherein a new test message is generated in each attempt.

18. A method comprising:
transmitting a test message in an allocated amount of bandwidth over a transmission medium, the allocated amount of bandwidth including a first channel time block and a second channel time block after a periodic beacon signal, the first channel time block to include the test message,
receiving a response message in the allocated amount bandwidth in response to the test message, the second channel time block to include the response message; and
computing a round-trip time based on a time different between the transmission of the test message and the receipt of the response message,
wherein a first time period between the beginning of the first channel time block and the beginning of the second channel time block is less than or equal to a predefined maximum time period, and a second time period between the beginning of the first channel time block and the beginning of the second channel time block is greater than or equal to a predefined minimum time period.

19. A method comprising:
receiving a test message in an allocated amount of bandwidth over a transmission medium, the allocated amount of bandwidth including a first channel time block and a second channel time block after a periodic beacon signal, the first channel time block including the test message,
wherein a first time period between the end of the first channel time block and the beginning of the second channel time block is less than or equal to a predefined maximum time period, and a second time period between the end of the first channel time block and the beginning of the second channel time block is greater than or equal to a predefined minimum time period.

20. The method of claim 19 further comprising:
requesting the allocated amount of bandwidth for a response message, wherein the transmission medium includes a wireless transmission medium;
computing the response message in response to the test message; and
transmitting the response message in the second channel time block.

21. The method of claim 20 further comprising:
transmitting the response message for a predefined number of times to satisfy a response time prior to receiving further transmission.

22. The method of claim 20 further comprising:
transmitting the response message in a Random Access Time Block.

23. The method of claim 19 further comprising:
receiving a test setup packet prior to receiving the test message;
computing a pre-computed test packet and a response message based on the test setup packet;
comparing the pre-computed test packet with the test message; and
transmitting the response message only when the pre-computed test packet is substantially similar to the test message.

24. A method comprising:
receiving a test message in an allocated amount of bandwidth over a transmission medium, the allocated amount of bandwidth including a first channel time block and a second channel time block after a periodic beacon signal, the first channel time block including the test message,
wherein a first time period between the beginning of the first channel time block and the beginning of the second channel time block is less than or equal to a predefined maximum time period, and a second time period between the beginning of the first channel time block and the beginning of the second channel time block is greater than or equal to a predefined minimum time period.

25. A method comprising:
receiving a request to allocate an amount of bandwidth over a transmission medium for a test message generated by a source device and a response message generated by a sink device; and
allocating the request of the amount of bandwidth with a first channel time block and a second channel time block after a periodic beacon signal, the first channel time block to include the test message, and the second channel time block to include the response message,
wherein a first time period between the end of the first channel time block and the beginning of the second channel time block is less than or equal to a predefined maximum time period, and a second time period between the end of the first channel time block and the beginning of the second channel time block is greater than or equal to a predefined minimum time period.

26. A method comprising:
receiving a request to allocate an amount of bandwidth over a transmission medium for a test message generated by a source device and a response message generated by a sink device; and
allocating the request of the amount of bandwidth with a first channel time block and a second channel time block after a periodic beacon signal, the first channel time block to include the test message, and the second channel time block to include the response message,
wherein a first time period between the beginning of the first channel time block and the beginning of the second channel time block is less than or equal to a predefined maximum time period, and a second time period between the beginning of the first channel time block and the beginning of the second channel time block is greater than or equal to a predefined minimum time period.

* * * * *